Patented Oct. 9, 1945

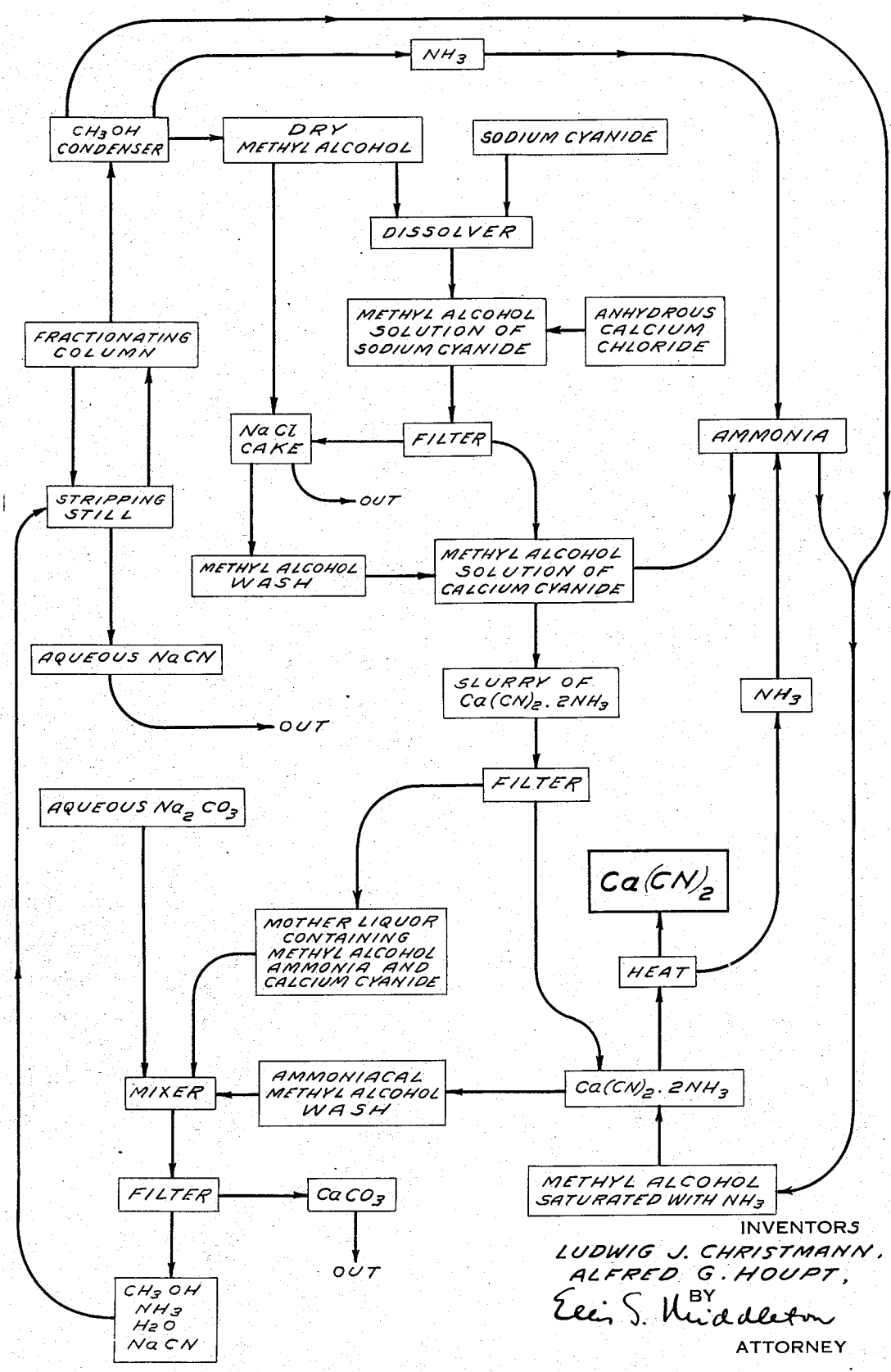

2,386,436

UNITED STATES PATENT OFFICE 2,386,436

PREPARATION OF ALKALINE EARTH METAL CYANIDES BY DOUBLE DECOMPOSITION

Ludwig J. Christmann, Yonkers, N. Y., and Alfred G. Houpt, Stamford, Conn., assignors to American Cyanamid Company, New York, N. Y., a corporation of Maine Application May 10, 1943, Serial No. 486,348

15 Claims. (Cl. 23—79)

The present invention relates to a method of preparing alkaline earth metal cyanides.

These compounds are adapted for a variety of uses, for example, calcium cyanide is a readily available source of hydrocyanic acid through decomposition when exposed to a moist atmosphere. Consequently, the compound is applicable to such uses as fumigation for the control and extermination of insects. Calcium cyanide is also utilized in the mining industry, for example, in processes for the extraction of metals from their ores. Barium and strontium cyanides are of particular utility as cementation agents in fused salt baths for case-hardening iron and steel articles.

The principal object of this invention is to provide a method whereby the alkaline earth metal cyanides may be readily obtained in a substantially pure form. A further object resides in a method for the production of the alkaline earth metal cyanides requiring only simple equipment with high efficiencies. Other objects will appear hereinafter.

It has been found that the above objects may be attained by establishing a cycle of operation which includes the steps of dissolving an alkali metal cyanide in an alcohol chosen from the group consisting of methyl and ethyl alcohol, adding an alkaline earth metal chloride to the alcohol solution, removing the insolubles and recovering the alkaline earth metal cyanide from the solution.

The preferred system of recovering the alkaline earth metal cyanide may include the steps of treating the solution with ammonia, separating the precipitated alkaline earth metal cyanide diammoniate from the mother liquor, deammoniating the same to produce the desired alkaline earth metal cyanide and recovering alcohol and/or ammonia for return to the cycle.

A convenient method of carrying out the above cycle of operation is shown in diagrammatic form in the accompanying flow sheet. When the method is used to produce the cyanide of calcium, for example, one mole equivalent of sodium cyanide is dissolved in a sufficient quantity of substantially dry methyl alcohol. One-half mole equivalent of anhydrous calcium chloride is then added slowly to the alcohol solution with continuous stirring and cooling to a temperature preferably below 40° C. Double decomposition takes place with the formation of a slurry containing sodium chloride as an insoluble material and calcium cyanide in solution. The slurry is filtered, leaving in the filter cake the sodium chloride and any undesirable impurities which may have been present in the reactants. The filter cake may be washed with methyl alcohol and the washings added to the filtrate. The alcohol solution of calcium cyanide is a light straw-colored liquid which is reasonably stable upon standing, particularly if maintained at low temperatures.

In the preferred form, dry ammonia gas is then introduced into the calcium cyanide solution, whereupon calcium cyanide diammoniate is precipitated as a crystalline, grayish-white, readily filterable solid, having a slight pinkish cast. Due to the comparatively high heat of solution of ammonia in methyl alcohol, cooling of the mixture during the ammoniation is desirable, preferably to a temperature below 35° C., to avoid undue azulmic decomposition and darkening of the liquor.

Dry or substantially anhydrous reagents are preferred in the present method due to the fact that moisture has a tendency to decompose the alkaline earth metal cyanides, particularly the calcium cyanide, with consequent lessening of yields.

Where anhydrous liquid ammonia is available, this material may be used advantageously for the simple reason that its addition at this point tends to maintain a desirably low temperature in the precipitating vessel.

While the use of ammonium hydroxide has a drawback in that it introduces water, yet in the case of concentrated ammonium hydroxide, only small quantities of water would enter the reacting menstruum, which may not cause a sufficient lowering of final yields to be entirely objectionable.

The slurry of calcium cyanide diammoniate is then filtered and the diammoniate may be washed with methyl alcohol saturated with ammonia. When so washed, the combined filtrate and washings containing methyl alcohol, ammonia and residual calcium cyanide are treated with a compound which, through double decomposition with the residual calcium cyanide, forms an insoluble calcium compound and a soluble cyanide. Compounds which may be used for this purpose are carbonates, and in particular, the alkali metal carbonates, e. g. sodium carbonate, which are added to the mother liquor preferably in aqueous solution. The mixture is then filtered to remove the precipitated calcium carbonate. The filtrate is charged into a stripping still equipped with a fractionating column and a condenser. The alcohol and ammonia passing from the fractionating column are condensed and separately returned to the cycle. The aqueous alkali metal cyanide residue is removed from the still and may be processed so as to obtain the cyanide in a substantially pure dry form and thereafter returned to the cycle.

In the above step, the mother liquor from the diammoniate precipitation is thus treated for the purpose of having present a more stable cyanide, namely, sodium cyanide, from which the alcohol can be distilled. When the mother liquor without treatment is heated to a temperature sufficient to distill off the alcohol, a reaction takes place between the residual calcium cyanide and the alcohol, forming impurities which carry over in the distillate.

The calcium cyanide diammoniate is then de-ammoniated by heating to produce the substantially pure calcium cyanide, and the evolved ammonia returned to the cycle. A temperature of from 200 to 230° C. is required for rapid separation of the ammonia. Temperatures within the range of 180° to 325° C. are feasible. However, care must be taken at the higher temperatures to avoid decomposition of the calcium cyanide. The deammoniation may be carried out by heating the diammoniate under a partial vacuum to avoid the contact of air and particularly moisture, and to facilitate the removal of the evolved ammonia.

A highly important step in the above cycle is the treatment of the mother liquor from the diammoniate precipitation involving the recovery of the alcohol and ammonia reagents. It is important that the recovered alcohol be substantially ammonia-free when returned to the cycle as it has been found that an ammonia content greater than about one per cent greatly impedes the dissolution of the calcium cyanide therein. Recycling the mother liquor as such would therefore lessen the efficiency of the process. Furthermore, removal of the ammonia by merely heating the mother liquor is unsatisfactory as azulmic decomposition takes place with the formation of impurities soluble therein which lessen the grade of the final product if this liquor is used in a subsequent cycle. As a consequence, by recovering the cyanide, alcohol and ammonia separately from the mother liquor, interference of one with the other or with the efficient operation of the entire cycle is avoided, while at the same time all values can thus be used in this or other processes.

*Example*

Two moles of sodium cyanide (103.2 g. of 95% NaCN) were dissolved in 1400 cc. of dry methyl alcohol. One mole of calcium chloride (111 g. of 14-mesh anhydrous $CaCl_2$) was added slowly to the alcohol solution during a period of thirty minutes with continuous agitation and ice bath cooling to keep the temperature of the liquor below 30° C. The resulting slurry was stirred for an additional thirty minutes, then filtered and the sodium chloride filter cake washed with 200 cc. of dry methyl alcohol. The combined filtrate and washings were treated with ten moles of gaseous ammonia at the rate of two moles per hour with stirring and cooling to a temperature of about 20° C. The resulting suspension of calcium cyanide diammoniate crystals was filtered, and the filter cake washed with 100 cc. of cold dry methyl alcohol saturated with ammonia. The combined filtrate and wash liquor containing methyl alcohol, ammonia and residual calcium cyanide was treated with a 5% aqueous sodium carbonate solution to convert the calcium cyanide to sodium cyanide. The precipitated calcium carbonate was filtered off and the filtrate charged into a stripping still equipped with a fractionating column and a condenser. The methyl alcohol and ammonia were distilled from the mixture leaving the aqueous sodium cyanide residue in the still. The methyl alcohol was condensed and recovered substantially ammonia-free. The ammonia was subsequently recovered and recycled. The crystalline calcium cyanide diammoniate was heated under a partial vacuum for 4 hours at a temperature of from 200 to 220° C., and the evolved ammonia recovered. The remaining product was a pale gray powder, analyzing 97.8% calcium cyanide.

Similarly, other alkaline earth metal cyanides may be prepared in substantially pure from utilizing the alkaline earth metal chlorides, it being highly important that in the recycling of the alcohol, the ammonia be removed.

When ethyl alcohol is used in place of methyl alcohol in the process, a larger quantity will be required due to the lower solubility of the alkaline earth metal cyanides therein.

The operation as described, affords a convenient and reliable method for producing high grade alkaline earth metal cyanides.

While the invention has been described with particular reference to specific embodiments, it is to be understood that it is not to be limited thereto but is to be construed broadly and restricted solely by the scope of the appended claims.

We claim:
1. A method of producing an alkaline earth metal cyanide which includes the steps of dissolving an alkali metal cyanide in an alcohol chosen from the group consisting of methyl and ethyl alcohol, adding an alkaline earth metal chloride to the alcohol solution, removing the insolubles, adding ammonia to the solution to precipitate an alkaline earth metal cyanide diammoniate, separating the precipitated alkaline earth metal cyanide diammoniate from the mother liquor containing alcohol, ammonia and residual alkaline earth metal cyanide, deammoniating the alkaline earth metal cyanide diammoniate, separating a substantially ammonia-free alcohol from the mother liquor and returning the said alcohol to the cycle.

2. The method of claim 1 in which the alcohol and ammonia are anhydrous.

3. The method of claim 1 in which the alkaline earth metal chloride is added to the alcohol solution maintained at a temperature not exceeding about 40° C.

4. The method of claim 1 in which the solution is treated with ammonia at a temperature not exceeding about 35° C.

5. The method of claim 1 in which the alkaline earth metal cyanide diammoniate is deammoniated at a temperature within the range of 180 to 325° C.

6. The method of claim 1 in which alcohol and ammonia are vaporized from the mother liquor and a substantially ammonia-free alcohol condensed from said vapors.

7. The method of claim 1 in which prior to the separation of the substantially ammonia-free alcohol, there is added to the mother liquor a compound which through double decomposition with the residual alkaline earth metal cyanide forms an insoluble alkaline earth metal compound and a soluble cyanide, and removing the insoluble alkaline earth metal compound.

8. The method of claim 1 in which prior to the separation of the substantially ammonia-free alcohol, there is added to the mother liquor an aqueous solution of a carbonate, and removing the precipitated alkaline earth metal carbonate.

9. The method of claim 1 in which prior to the separation of the substantially ammonia-free alcohol, there is added to the mother liquor an aqueous solution of sodium carbonate, and removing the precipitated alkaline earth metal carbonate.

10. A method of producing an alkaline earth metal cyanide which includes the steps of dissolving an alkali metal cyanide in an alcohol chosen from the group consisting of methyl and ethyl alcohol, adding an alkaline earth metal chloride to the alcohol solution, removing the insolubles, adding ammonia to the solution to precipitate an alkaline earth metal cyanide diammoniate, separating the precipitated alkaline earth metal cyanide diammoniate from the mother liquor containing alcohol, ammonia and residual alkaline earth metal cyanide, deammoniating the alkaline earth metal cyanide diammoniate and returning the ammonia therefrom to the cycle, separating a substantially ammonia-free alcohol from the mother liquor and returning the said alcohol to the cycle.

11. A method of producing an alkaline earth metal cyanide which includes the steps of dissolving an alkali metal cyanide in an alcohol chosen from the group consisting of methyl and ethyl alcohol, adding an alkaline earth metal chloride to the alcohol solution, removing the insolubles, adding ammonia to the solution to precipitate an alkaline earth metal cyanide diammoniate, separating the precipitated alkaline earth metal cyanide diammoniate from the mother liquor containing alcohol, ammonia and residual alkaline earth metal cyanide, separating a substantially ammonia-free alcohol from the mother liquor and returning the said alcohol to the cycle, deammoniating the alkaline earth metal cyanide diammoniate, recovering the ammonia from the mother liquor and the deammoniation step and returning the same to the cycle.

12. A method of producing calcium cyanide which includes the steps of dissolving sodium cyanide in methyl alcohol, adding calcium chloride to the alcohol solution, rejecting the insolubles, precipitating calcium cyanide diammoniate from the solution with substantially dry ammonia, filtering the precipitated calcium cyanide diammoniate from the mother liquor containing methyl alcohol, ammonia and residual calcium cyanide, adding aqueous sodium carbonate to the mother liquor and removing the precipitated calcium carbonate, distilling the methyl alcohol and ammonia from the thus treated mother liquor, recovering the aqueous sodium cyanide from the still residue, separately returning the methyl alcohol and ammonia to the cycle, heating the calcium cyanide diammoniate under partial vacuum at a temperature of from 200 to 220° C. and returning the evolved ammonia to the cycle.

13. A method of producing an alkaline earth metal cyanide which includes the steps of dissolving an alkali metal cyanide in an alcohol chosen from the group consisting of methyl and ethyl alcohol, adding an alkaline earth metal chloride to the alcohol solution, removing the insolubles and recovering the alkaline earth metal cyanide from the solution.

14. A method of producing calcium cyanide which includes the steps of dissolving sodium cyanide in methyl alcohol, adding calcium chloride to the alcohol solution, removing the insoluble and recovering calcium cyanide from the solution.

15. A method of producing calcium cyanide which includes the steps of dissolving sodium cyanide in methyl alcohol, adding calcium chloride to the alcohol solution, removing the insolubles, adding ammonia to the alcoholic solution of calcium cyanide to precipitate calcium cyanide diammoniate and deammoniating the calcium cyanide diammoniate.

LUDWIG J. CHRISTMANN,
ALFRED G. HOUPT.